No. 869,003. PATENTED OCT. 22, 1907.
C. A. MARSHALL.
AUTOMATIC COUPLING FOR BRAKE PIPES.
APPLICATION FILED APR. 3, 1907.
4 SHEETS—SHEET 1.
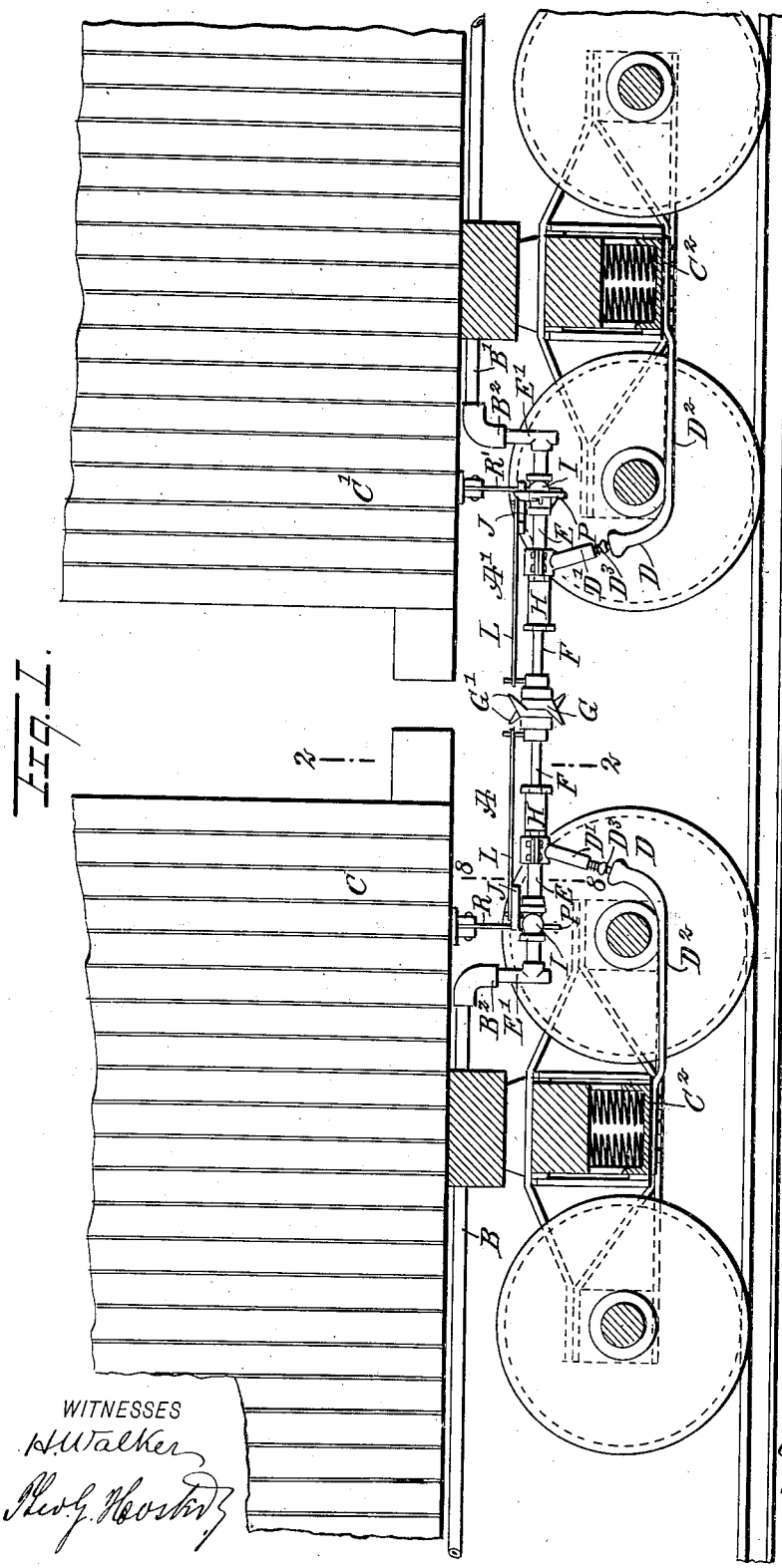
WITNESSES
H. Walker
INVENTOR
Charles Albert Marshall
BY Munn & Co.
ATTORNEYS

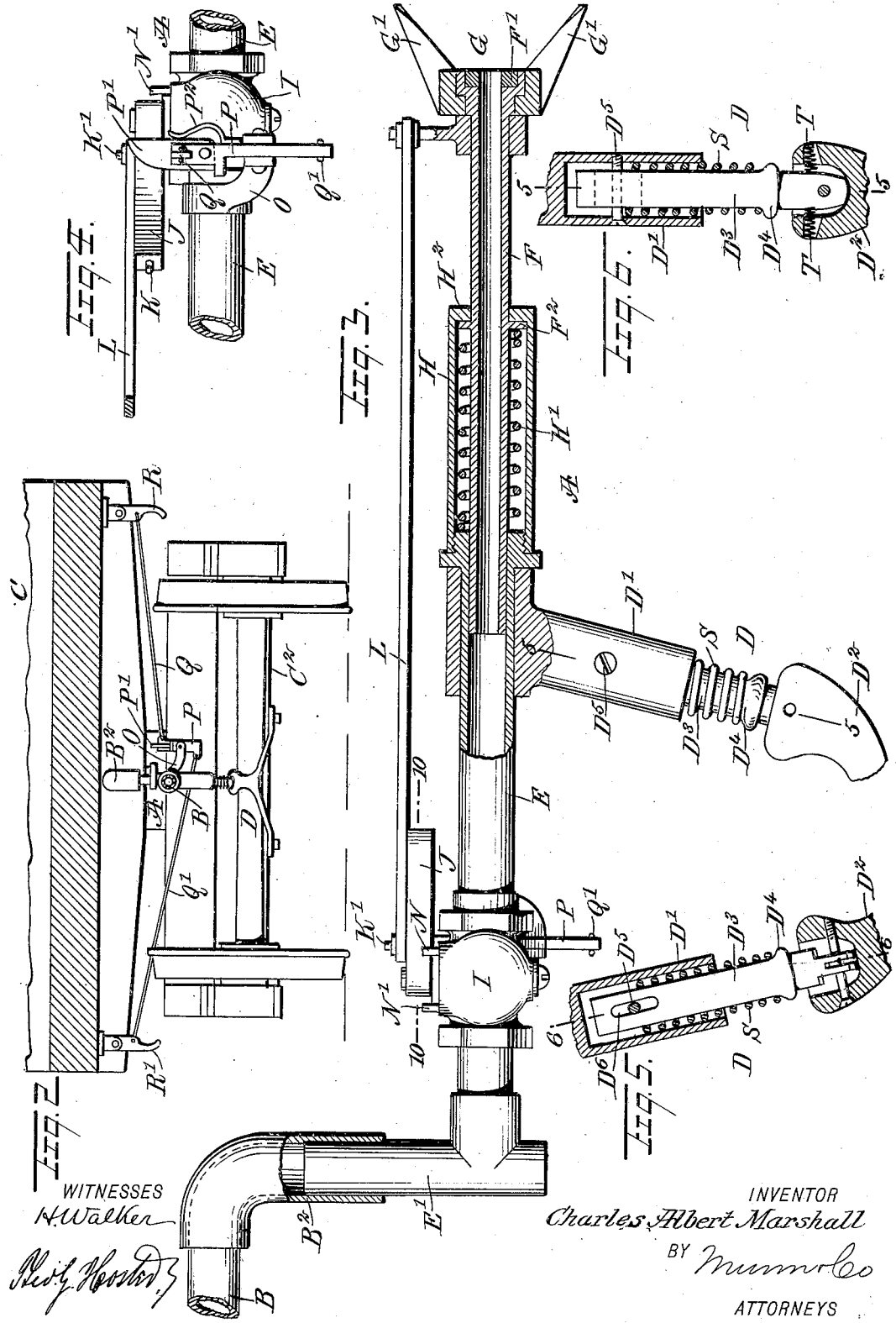

No. 869,003. PATENTED OCT. 22, 1907.
C. A. MARSHALL.
AUTOMATIC COUPLING FOR BRAKE PIPES.
APPLICATION FILED APR. 3, 1907.
4 SHEETS—SHEET 3.
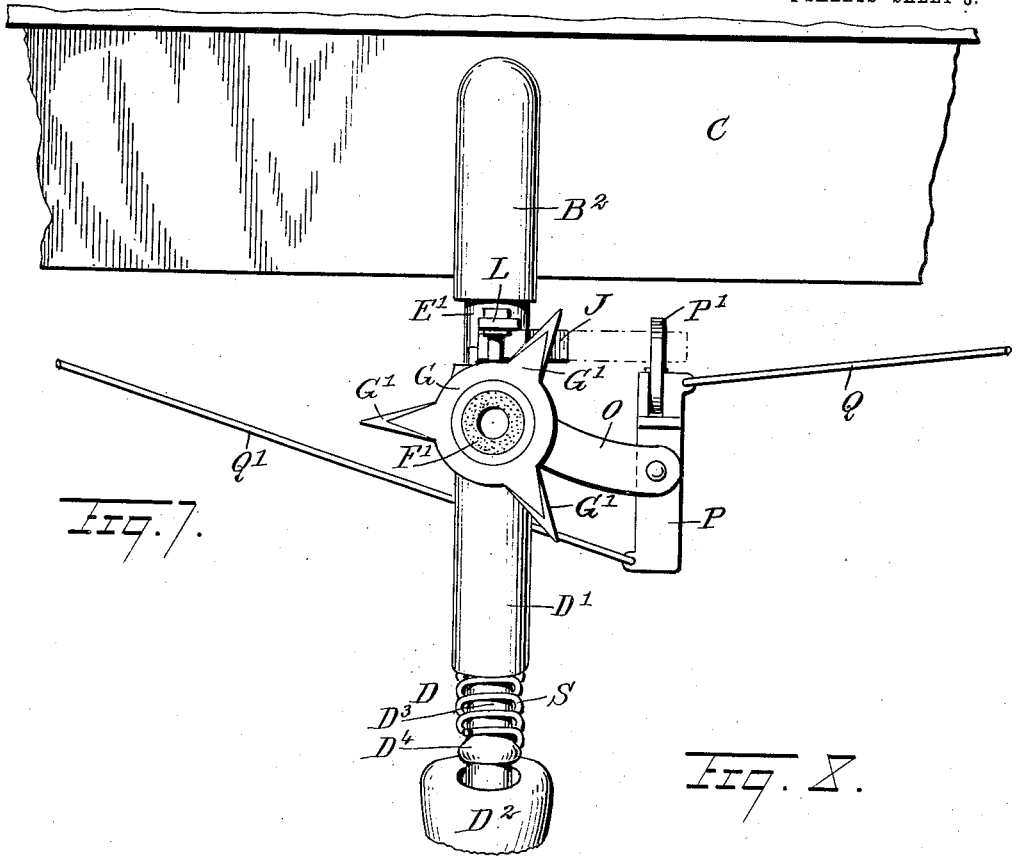
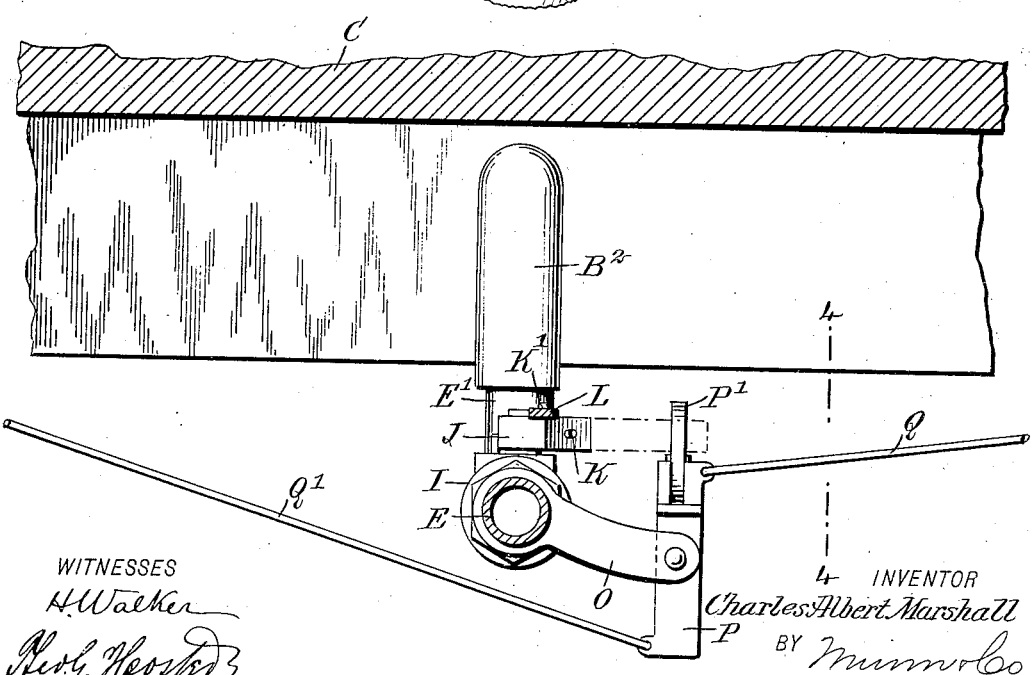
WITNESSES
H. Walker
INVENTOR
Charles Albert Marshall
BY Munn & Co
ATTORNEYS No. 869,003. PATENTED OCT. 22, 1907.
C. A. MARSHALL.
AUTOMATIC COUPLING FOR BRAKE PIPES.
APPLICATION FILED APR. 3, 1907.
4 SHEETS—SHEET 4.
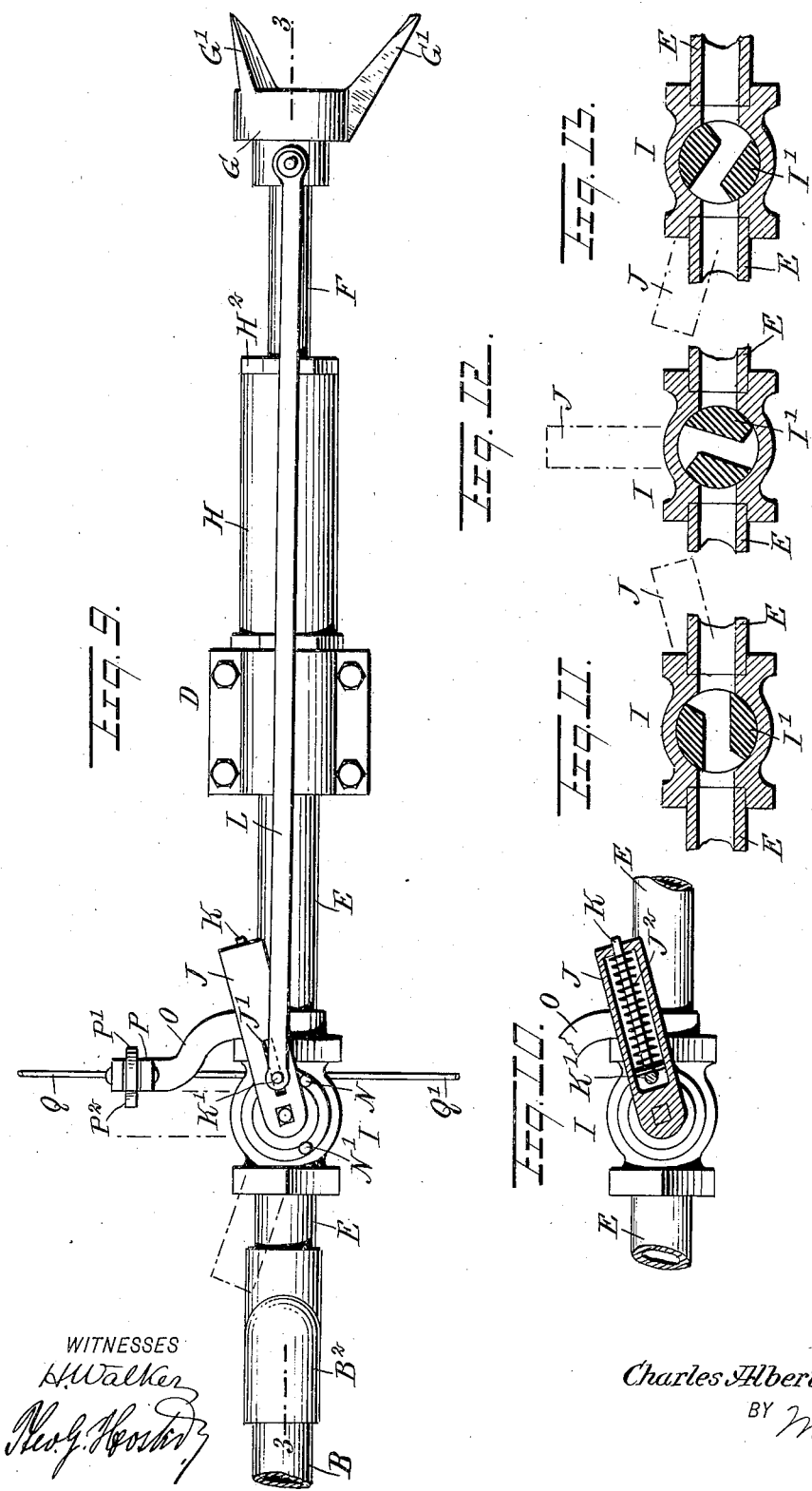
WITNESSES
INVENTOR
Charles Albert Marshall
BY
ATTORNEYS

UNITED STATES PATENT OFFICE.

CHARLES ALBERT MARSHALL, OF TULSA, INDIAN TERRITORY.

AUTOMATIC COUPLING FOR BRAKE-PIPES.

No. 869,003.      Specification of Letters Patent.      Patented Oct. 22, 1907.

Application filed April 3, 1907. Serial No. 366,139.

*To all whom it may concern:*

Be it known that I, CHARLES ALBERT MARSHALL, a citizen of the United States, and a resident of Tulsa, in the Creek Nation, Indian Territory, have invented a new and Improved Automatic Coupler for Air-Brake Pipes, of which the following is a full, clear, and exact description.

The object of the invention is to provide a new and improved automatic coupler for air brake pipes, arranged to automatically connect the air brake pipes of railroad cars while in the act of coupling the cars, and to form a continuous passage for the flow of the compressed air from one car to another, without danger of leakage.

The invention consists of novel features and parts and combinations of the same, which will be more fully described hereinafter and then pointed out in the claims.

A practical embodiment of the invention is represented in the accompanying drawings, forming a part of this specification, in which similar characters of reference indicate corresponding parts in all the views.

Figure 1 is a side elevation of the improvement as applied to two coupled railroad cars, parts of the latter being in section; Fig. 2 is a transverse section of the same on the line 2—2 of Fig. 1; Fig. 3 is an enlarged side elevation of the improvement partly in section on line 3—3 of Fig. 9; Fig. 4 is a rear sectional side elevation of the controlling valve, the section being on the line 4—4 of Fig. 8; Fig. 5 is a sectional side elevation of the coupling support, the section being on the line 5—5 of Figs. 3 and 6; Fig. 6 is a transverse section of the same on the line 6—6 of Fig. 5; Fig. 7 is an enlarged end view of the improvement as applied; Fig. 8 is an enlarged cross section of the same on the line 8—8 of Fig. 1; Fig. 9 is a plan view of the improvement; Fig. 10 is a plan view of the controlling valve, the actuating receiver of which is shown in section on the line 10—10 of Fig. 3; and Figs. 11, 12 and 13 are sectional plan views of the controlling valve in different positions.

The couplers A and A′ are alike in construction and yieldingly connected with the train pipes B, B′ of the Westinghouse or other fluid air brake system attached to the under side of the car bodies of the cars C and C′ to be coupled together, and each of the said air brake pipe couplers A, A′ is supported by a support or bracket D attached to the spring plank C² of the brake of the corresponding car C or C′, the arrangement being such that the air brake pipe couplers A and A′ are located directly below the usual car coupler and extend in vertical planes passing lengthwise through the middle of the trucks and a predetermined distance above the track rails or wheel base so that the couplers A, A′ are at all times at a permanent or standard height above the track rails, to insure an easy, accurate and uniform coupling of the air brake couplers A and A′ on different cars irrespective of the load and shape of the car body.

Each coupler A and A′ is provided with air-pipe sections E and F, of which the pipe section F has an air-tight joint with and telescopes in the pipe-section E, and the rear end of the latter terminates in an upwardly extending tubular pivot E′ engaging a tubular bearing B² on the corresponding end of the train pipe B or B′, thus forming a swivel connection between the pipes E and B (or B′), to allow lateral as well as up and down movement of the pipe B or B′ relative to the corresponding pipe E of the couplers A and A′.

The forward end of each pipe section F extends beyond the buffer of the corresponding car C or C′, and the said forward end is provided with a coupling head G adapted to engage the corresponding coupling head G of the opposite pipe coupler, and the coupling head G is preferably provided with a plurality of forwardly and outwardly extending prongs G′, each of which tapers to a point. A rubber or other elastic packing or mouth piece F′ is arranged in the mouth of the pipe F and is adapted to form an air-tight joint with a similar packing or mouth piece F′ when the other coupler and the cars come together.

On the forward end of the pipe section E is secured a cylindrical casing H through which extends a portion of the pipe section F (see Fig. 3), and within the said casing H and coiled around the pipe section F is a spring H′ resting with its rear end on the forward end of the pipe section E and pressing with its forward end on a shoulder or collar F² formed on the pipe section F within the casing H. The shoulder F² is adapted to abut against the head H² of the casing H to limit the forward movement of the pipe section F.

By the arrangement described the spring H′ normally holds the pipe section F in an outermost position, and when the two cars C and C′ are coupled together and the heads G—G of the couplers A and A′ come together, then the pipe-sections F slide inward in the pipe sections E against the tension of the springs H′, so that an exceedingly firm joint is had between the coupling heads G, especially as the packings F′ abut against each other and are held in firm contact by the action of the compressed springs H′. Thus by the arrangement described a continuous passage is formed for the flow of the compressed air from one car to another, without danger of leakage.

At or near the rear end of each pipe-section E is arranged a controlling valve I having a vertically disposed plug valve I′ (see Figs. 11, 12 and 13), the stem of which is provided with a lever J made hollow and containing a rod K terminating at its inner end in a vertical offset K′ extending through an elongated slot J′ formed in the top of the lever J. The offset K′ is connected by a link L with the forward end of the pipe-section F and the rod K is pressed on within the lever J by a spring J², to normally hold the rod K in an innermost position, that is, with the offset K' near the stem of the plug valve I'. Now when the two cars C and C' are coupled together and the pipe sections F are caused to slide rearward, as previously explained, then each link L imparts a swinging motion to the corresponding lever J, so as to turn the plug valve I' into the open position shown in Fig. 13, to insure a continuous flow of the compressed air through the pipe-section E. The swinging motion of the lever J is limited by stops N and N' held on top of the controlling valve I.

Now from the foregoing it will be seen that when a coupler A or A' is in an uncoupled position the plug valve I' is open, as illustrated in Fig. 11, to hold the fluid pressure brake in a set position, and when the cars are coupled together, as above described then the engaged plug I' is turned likewise into an open position, to insure a continuous flow of the compressed air from one train pipe to the other, to enable the engineer in charge of the train to control the brakes in the usual manner. Now it will also be seen that if the cars are uncoupled at any time, as, for instance, by a train breaking in two, then the springs H' immediately force the pipe-section F outward, so that the link L acting on the lever J causes the plug valve I' to move into an open position, as shown in Fig. 11, whereby the air can escape from the train pipe, to cause setting of the brakes with a view to bring the broken sections of the train to a standstill.

In certain operations such as switching, making up trains, etc., it is desirable that the brakes be released and so retained as long as necessary, and for this purpose the following arrangement is made, with a view to hold the valve plug I' in the closed position illustrated in Fig. 12: On the pipe-section E is secured a transversely extending bracket O on which is fulcrumed a vertically disposed lever P provided with a latch P' pressed on by a spring P², to normally hold the latch in an uppermost position and in the path of the lever J whenever the lever P is swung into a vertical position. For the purpose described the upper and lower ends of the lever P (see Fig. 2) are pivotally connected by transversely extending links Q and Q' with hand levers R, R' fulcrumed on the car body of the car C or C' at or near the sides thereof, so as to be within convenient reach of the operator. The latch P' is rounded off at its forward edge, as plainly indicated in Fig. 4, so as to readily yield to backward pressure when the lever J swings from its front to a rearmost position, but when the lever P is moved into a vertical position and the lever J is in a rearmost position after the cars are coupled, and the cars are then uncoupled, then the outward movement of the section F is not completed, as the lever J in swinging from its rearmost to a forward position strikes the latch P' and is held by the same in an intermediate position (see Fig. 12) with the plug valve I' held closed, so that air cannot escape from the train pipe and consequently the brakes are not applied or set.

When it is desired to apply the brakes it is only necessary for the operator to pull either on the lever R in an outward direction, so as to impart a swinging motion to the lever P, with a view to move the latch P' out of engagement with the lever J, to permit the spring H' to move the pipe section F outward to its full extent, so that the lever J is swung to its forward position shown in Fig. 11, and the plug valve I' is opened to allow the escape of air and setting of the brakes.

The detail construction of the support D is as follows, special reference being had to Figs. 3, 5 and 6: The support D is provided with the members D', D², of which the member D' is fixed to the pipe-section E immediately in the rear of the spring casing H, to take up all shock when the pipe section F moves inward in the pipe section E against the tension of the spring H'. The member D² is bolted or otherwise secured to the spring plank C² of the car truck previously referred to. The members D' and D² are connected with each other by a connecting bar D³ extending with its upper end into the recessed lower end of the member D' and pivotally connected at its lower end with a socket in the upper end of the member D². A spring S is coiled around the bar D³ and rests with its lower end on a collar D⁴ formed on the bar D³, and the upper end of the said spring S abuts against a pin D⁵ held on the member D' and extending through an elongated slot D⁶ in the bar D³. Springs T, T in the socket of the member D² press opposite sides of the member D³, to normally support the latter in a vertical position, but to allow a transverse rocking thereof when a car goes around a curve, the spring S serving to allow an up and down yielding of the members D', D² in case of the car traveling over an uneven road bed. Thus by the arrangement described the support D is free to yield both in an up and down and transverse direction, but normally the support D holds the corresponding coupler A or A' in the normal standard position referred to.

The detail construction of the automatic coupler described can be varied without deviating from the spirit of the invention.

Although I have shown and described the device for coupling air brake pipes, it is evident that I do not limit myself to this particular use of the device, as the latter can be used for coupling pipes for the passage of other fluids, such as steam, gas and the like.

Having thus described my invention, I claim as new and desire to secure by Letters Patent:

1. In a coupler for an air brake pipe, in combination, telescoping pipe sections having an air-tight joint, a coupling head on one of the sections, a valve on one of the sections adapted to be operated by the movement of the other section, and means to open the valve when the pipe is uncoupled.

2. In a coupler, in combination, pipe sections having a tight joint and adapted to yieldingly telescope or move longitudinally one within the other, a coupling head on one of the said sections, and a valve on one of the sections, adapted to be opened by the movement of the other section when the pipe is coupled or uncoupled.

3. In a coupler, in combination, pipe sections adapted to yieldingly telescope, a coupling-head for one of the sections, a valve in one of the sections adapted to be opened by movement of the other section when the cars are coupled, a latch adapted to engage the valve-lever and retain the valve in closed position when the cars are uncoupled, and means to disengage the latch and allow the valve to open.

4. In a coupler, in combination, pipe sections adapted to yieldingly telescope, a coupling-head on one of the sections, a valve in one of the sections, whose lever is connected to the other section, whereby movement of the sections relative to each other opens the valve when the pipes are coupled or uncoupled, and means to retain the valve in closed position when desired.

5. In a coupler, in combination, pipe sections adapted to yieldingly telescope, a pronged coupling-head on one of the sections, a valve in one of the sections, adapted to be opened by movement of the other section, and means to retain the valve in closed position when desired.

6. In a coupler for an air brake pipe, in combination, telescoping air-pipe sections having an air-tight joint, a coupling head on one of the sections, a valve in one of the sections, a rod connecting the valve lever with the other sections, and a yielding connection between the rod and the valve lever.

7. In an air brake pipe coupling, in combination, telescoping air-pipe sections having an air-tight joint, a spring connection between the sections, a coupler head on one of the sections, and a valve in one of the sections adapted to be opened when the sections are forced together by the act of coupling, and also to be opened by the movement of the sections, due to the spring, when the cars are uncoupled.

In testimony whereof I have signed my name to this specification in the presence of two subscribing witnesses.

CHARLES ALBERT MARSHALL.

Witnesses:
JOSEPH KOSTACHEK,
HENRY C. CALHOUN.